(12) United States Patent
Taniuchi et al.

(10) Patent No.: US 11,715,855 B2
(45) Date of Patent: Aug. 1, 2023

(54) BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 17/151,223

(22) Filed: Jan. 18, 2021

(65) Prior Publication Data
US 2021/0234223 A1 Jul. 29, 2021

(30) Foreign Application Priority Data

Jan. 24, 2020 (JP) ................. 2020-010214

(51) Int. Cl.
| | |
|---|---|
| *H01M 50/204* | (2021.01) |
| *H01M 50/264* | (2021.01) |
| *H01M 50/533* | (2021.01) |
| *H01M 50/505* | (2021.01) |
| *H01M 50/202* | (2021.01) |
| *H01M 10/6551* | (2014.01) |
| *H01M 50/291* | (2021.01) |
| *H01M 10/0525* | (2010.01) |
| *H01M 10/613* | (2014.01) |

(52) U.S. Cl.
CPC ..... *H01M 50/204* (2021.01); *H01M 10/0525* (2013.01); *H01M 10/613* (2015.04); *H01M 10/6551* (2015.04); *H01M 50/202* (2021.01); *H01M 50/264* (2021.01); *H01M 50/291* (2021.01); *H01M 50/505* (2021.01); *H01M 50/533* (2021.01)

(58) Field of Classification Search
None
See application file for complete search history.

(56) References Cited

U.S. PATENT DOCUMENTS

| | | | |
|---|---|---|---|
| 2015/0380698 A1* | 12/2015 | Springauf | ........... H01M 50/258 429/97 |
| 2019/0393458 A1 | 12/2019 | Zeng et al. | |
| 2020/0335737 A1* | 10/2020 | Hilligoss | ........... H01M 50/1245 |

FOREIGN PATENT DOCUMENTS

| | | |
|---|---|---|
| CN | 101794904 A | 8/2010 |
| CN | 104854725 A | 8/2015 |
| CN | 106684283 A | 5/2017 |
| CN | 107195830 A | 9/2017 |
| CN | 208336326 U | 1/2019 |
| JP | 2004063278 A | 2/2004 |
| JP | 2012169204 A | 9/2012 |
| WO | 2019188825 A1 | 10/2019 |

* cited by examiner

*Primary Examiner* — Carmen V Lyles-Irving
(74) *Attorney, Agent, or Firm* — CKC & Partners Co., LLC

(57) ABSTRACT

Provided is a battery module including a plurality of battery cells stacked on one another and being capable of effectively preventing damage to the battery cells despite such a configuration. A battery module 1 includes a plurality of battery cells 10 stacked on one another and a battery cell support 2. The battery cells 10 each include a battery 11 and an exterior casing 12 accommodating the battery 11. The battery cell support 2 is disposed between the plurality of battery cells 10. The battery module preferably further includes a fixation film 6 wound around the plurality of battery cells in a stacking direction and fixing the plurality of battery cells.

12 Claims, 8 Drawing Sheets

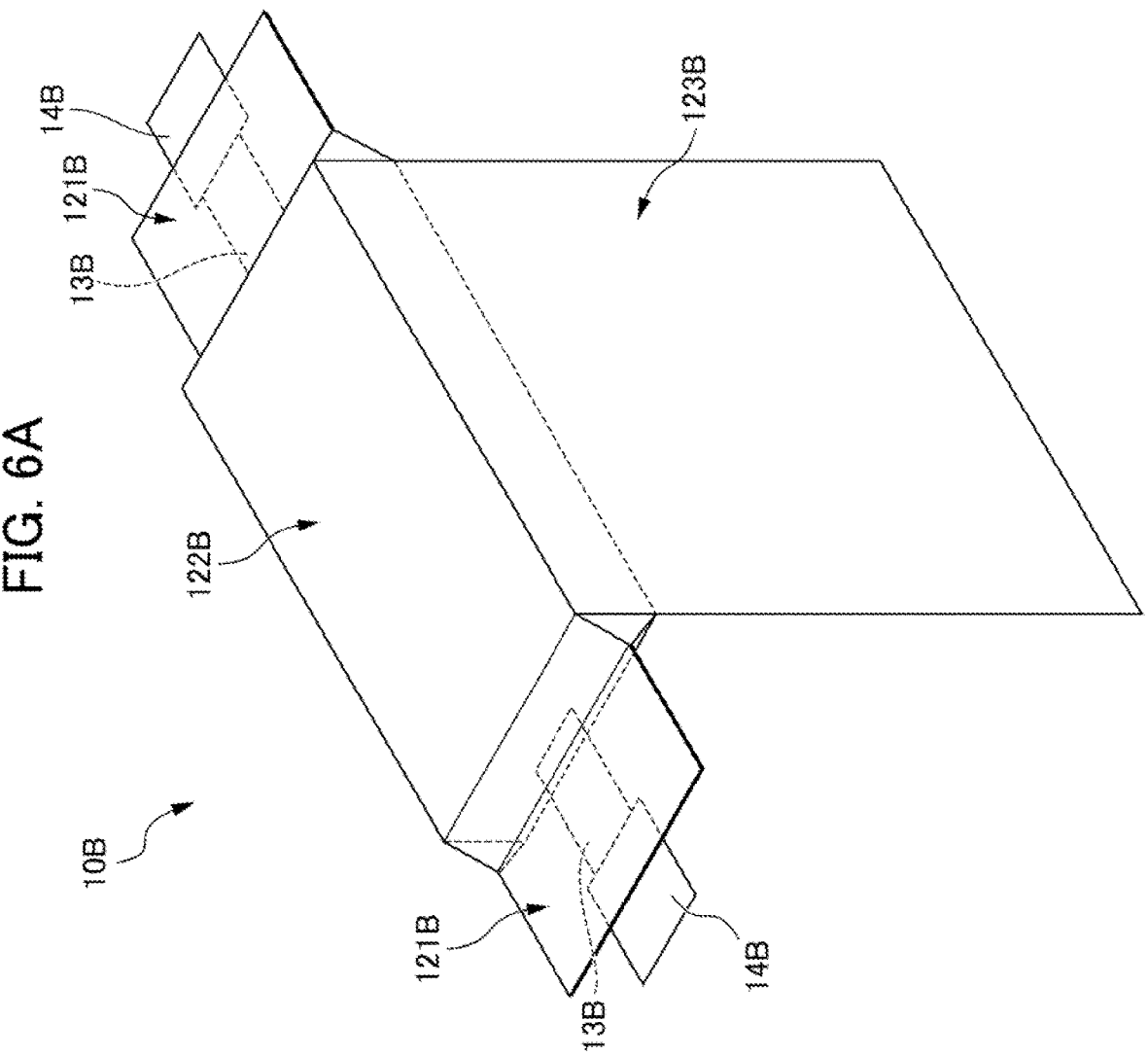

BATTERY MODULE

This application is based on and claims the benefit of priority from Japanese Patent Application 2020-010214, filed on 24 Jan. 2020, the content of which is incorporated herein by reference.

BACKGROUND OF THE INVENTION

Field of the Invention

The present disclosure relates to a battery module mainly including a plurality of battery cells stacked on one another.

Related Art

In recent years, the prevalence of various large or small electrical and electronic devices such as cars, personal computers, and mobile phones has led to the rapidly growing demand for high-capacity and high-power batteries. Examples of such batteries include a liquid battery cell containing an organic electrolytic solution as an electrolyte between a positive electrode and a negative electrode, and a solid-state battery cell containing a solid electrolyte instead of an organic electrolytic solution serving as an electrolyte. A battery of laminate cell type is known, which is a battery such as described above enclosed in laminate film (exterior casing), hermetically sealed, and formed into a plate shape. In applications such as electric vehicles (EVs) and hybrid electric vehicles (HEVs), a battery module is used, which is obtained by stacking a plurality of batteries of laminate cell type such as described above on one another and encasing the batteries. Enclosing each battery in an exterior casing precludes the atmosphere from entering the battery (for example, Japanese Unexamined Patent Application, Publication No. 2012-1691204).

Another technique that has been disclosed relates to a battery cell having heat seal portions each fixed between grasping means provided above and below the heat seal portion, aiming at providing a battery enclosed in laminate film (exterior casing) and improved in properties such as durability (for example, Japanese Unexamined Patent Application, Publication No. 2004-63278).

Furthermore, a battery cell has been disclosed that has an exterior casing obtained by folding a sheet of laminate film so as to enclose a battery, aiming at effectively improving the volumetric energy density of a resulting battery module while maintaining the sealing property of the laminate film (exterior casing) (WO2019/188825). According to WO2019/188825, the battery cell helps effectively improve the volumetric energy density of the battery module while maintaining the sealing property of the exterior casing.

Patent Document 1: Japanese Unexamined Patent Application, Publication No. 2012-169204

Patent Document 2: Japanese Unexamined Patent Application, Publication No. 2004-63278

Patent Document 3: PCT International Publication No. WO2019/188825

SUMMARY OF THE INVENTION

A battery module has a structure in which a plurality of battery cells are stacked on one another. In a case where the stacked battery cells in the structure are in direct contact with each other, the battery cells are susceptible to stress. If the battery cells are stressed, components of the battery cells such as electrodes can be damaged.

In a case where the battery cells are stacked solid-state battery cells containing a solid electrolyte, in particular, the risk of damage to electrodes and solid electrolyte layers therein due to stress on the battery cells is higher.

Like the battery cell according to the technique described in Japanese Unexamined Patent Application, Publication No. 2004-63278, a battery cell hermetically sealed at four joint portions, which is obtained by placing a battery between a stack of two film sheets and joining the film sheets opposed to each other at four sides of the stack, can be fixed between grasping means. However, in the case of the configuration in which the battery cell is fixed between the grasping means, ends of the battery cell are susceptible to stress. It is therefore impossible to reliably and sufficiently prevent damage to the battery cell.

Like the battery cell according to the technique described in WO2019/188825, a battery cell having an exterior casing obtained by folding a film sheet has a configuration that does not have joint portions at four sides thereof. It is therefore impossible to fix the battery cell using grasping means such as disclosed in Japanese Unexamined Patent Application, Publication No. 2004-63278.

The present disclosure aims to provide a battery module including a plurality of battery cells stacked on one another and being capable of effectively preventing damage to the battery cells despite such a configuration.

In order to solve the above-described problems, the inventors of the present disclosure have made intensive studies to find that it is possible to solve the above-described problems by disposing, between the battery cells, a battery cell support that directly supports the battery cells on surfaces thereof, and thus complete the present disclosure.

The present disclosure provides a battery module including a plurality of battery cells stacked on one another and a battery cell support. The battery cells each include a battery and an exterior casing accommodating the battery. The battery cell support is disposed between the plurality of battery cells and directly supports the battery cells on surfaces thereof.

This enables the battery module to effectively prevent damage to the battery cells despite the configuration in which the plurality of battery cells are stacked on one another.

The battery module may further include a fixation film wound around the plurality of battery cells in a stacking direction and fixing the plurality of battery cells.

The exterior casing of at least one battery cell of the plurality of battery cells may have extending portions extending in the stacking direction of the battery module; and the extending portions may fix the plurality of battery cells.

The extending portions of two battery cells of the plurality of battery cells may face each other and extend in the stacking direction of the battery module.

The battery cell support may have a low-height portion having a height equal to or lower than the battery cell in a height direction orthogonal to the stacking direction; and the fixation film or the extending portions for fixing the battery cell may overlap with the low-height portion of the battery cell support.

The battery module may further include a placement plate. The plurality of battery cells may be placed on the placement plate, and the battery cell support may be fixed to the placement plate.

The battery cell support may include a locking portion; the placement plate may include interposition portions capable of interposing the locking portion; and the interposition portions may interpose the locking portion, whereby the battery cell support may be fixed to the placement plate.

The interposition portions of the placement plate may be elastic interposition portions.

Holes may be correspondingly formed in the battery cell support and the placement plate, respectively; and shaft components may be inserted into the holes, whereby the battery cell support may be fixed to the placement plate.

The battery cell support may include a heat dissipation portion.

Each of the battery cells may include a current collector tab connected to the battery and a current collector tab lead connected to the current collector tab, and at least a portion of the current collector tab lead may be exposed outside the exterior casing.

The battery cell support may include a current collector tab support portion supporting the current collector tabs, the current collector tab leads, or both on surfaces thereof via the exterior casings.

The battery cell support may include a bus bar current-carrying portion being in direct contact with the current collector tab leads and supporting the current collector tab leads on surfaces thereof.

The battery module according to the present disclosure is capable of effectively preventing damage to the battery cells despite the configuration in which the plurality of battery cells are stacked on one another.

BRIEF DESCRIPTION OF THE DRAWINGS

FIG. 6A is a perspective view of a battery cell according to another embodiment;

DETAILED DESCRIPTION OF THE INVENTION

The following describes specific embodiments of the present disclosure in detail. However, the present disclosure is not in any way limited to the following embodiments, and appropriate modifications can be made within the scope of the purpose of the present disclosure to practice the present disclosure.

<Battery Module>

Figure 1A:
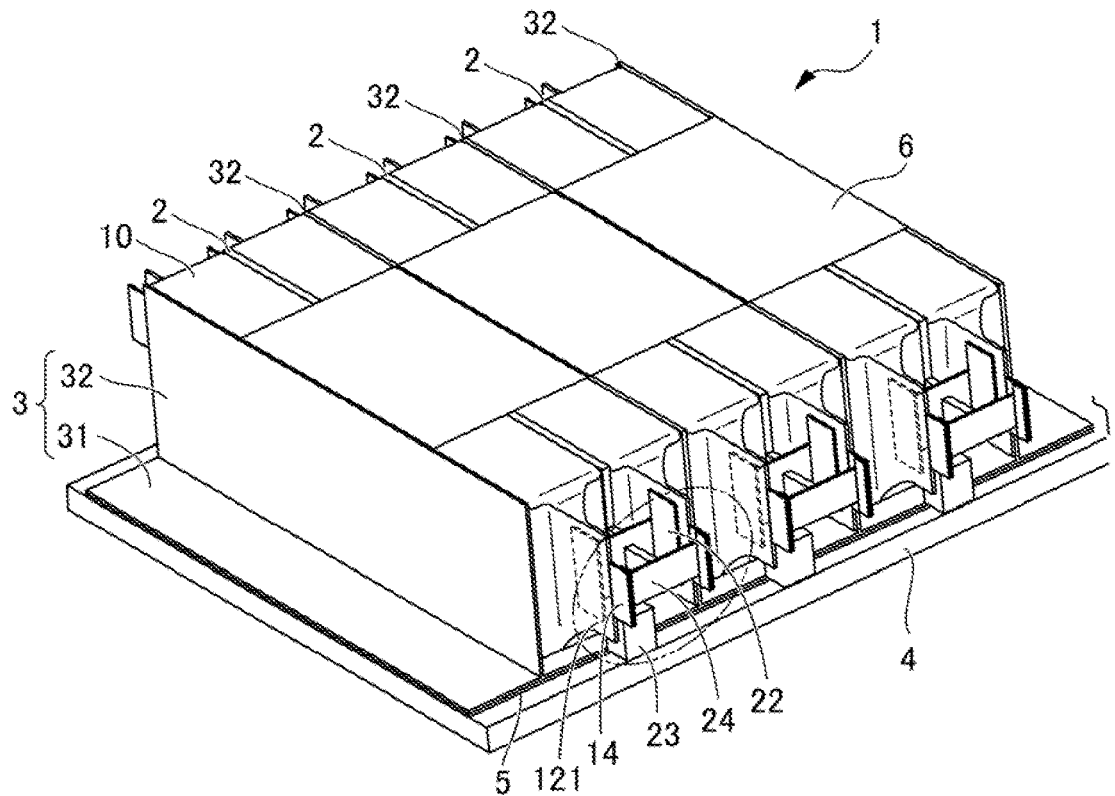
FIG. 1A is a perspective view of a battery module according to an embodiment of the present disclosure.
Figure 1B:
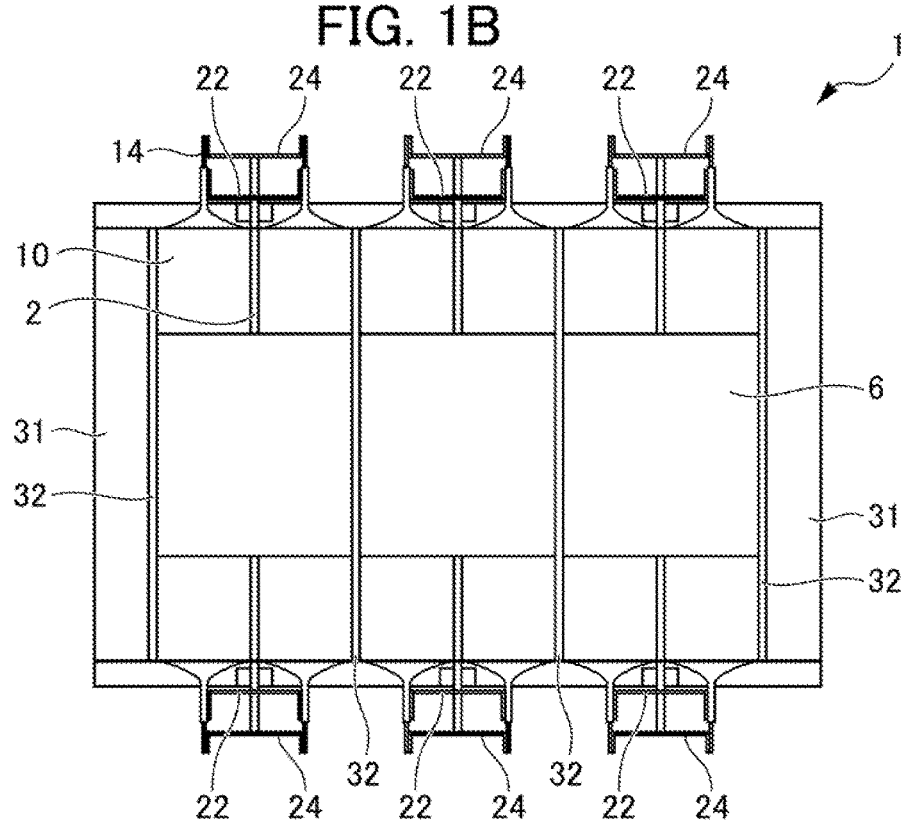
FIG. 1B is a plan view of the battery module according to the embodiment.

A battery module 1 according to an embodiment of the present disclosure includes a plurality of battery cells 10 stacked on one another as illustrated in FIGS. 1(a) and 1(b). The battery module 1 is characterized in that battery cell supports 2 are disposed between the battery cells 10.

The battery cell supports dispensed between the battery cells 10 are members that directly support the battery cells on surfaces thereof. The battery cell supports directly supporting the battery cells on the surfaces thereof allow for effective prevention of damage to the battery cells 10 due to direct contact between the battery cells and damage to the battery cells due to external force. A specific structure and material of the battery cell supports 2 are described below.

It is to be noted that the phrase "a battery cell support being disposed between a plurality of battery cells" does not mean that all interfaces between the battery cells have a battery cell support, and is to be understood to mean that at least one of the interfaces between the battery cells has a battery cell support.

In the battery module 1 illustrated in FIGS. 1(a) and 1(b), a cooling plate 3 is disposed on a placement plate 4. The plurality of battery cells 10 are placed on the placement plate 4 with the cooling plate 3 (or a vibration insulator 5) therebetween. The cooling plate 3 includes battery cell placement portions 31 that receive placement surfaces of the battery cells 10, and battery cell interposition portions 32 that extend upward from the battery cell placement portions 31 and that are interposed between the battery cells 10. The battery cell supports 2 and the battery cell interposition portions 32 are alternately disposed between the battery cells. The cooling plate 3 is mainly composed of a high thermal conductive material such as a metal.

The battery module according to the present, disclosure does not have to include the cooling plate. However, the configuration in which the battery cell interposition portions 32 are interposed between the battery cells 10 and/or the cooling plate 3 is in direct contact with the battery cells 10 as in the battery module 1 illustrated in FIGS. 1(a) and 1(b) allows for effective dissipation of heat generated from the battery cells.

The cooling plate 3 may be fixed to the placement plate 4. This reduces vibration of the battery cells 10 in a stacking direction and allows for effective prevention of damage to the battery cells 10.

The battery module 1 according to the present embodiment further includes a fixation film 6 wound in the stacking direction. The battery module according to the present disclosure does not have to include the fixation film. However, the configuration including the fixation film 6 allows for fixation of the plurality of battery cells 10, preventing damage to the battery cells more effectively.

Furthermore, the battery module 1 according to the present embodiment includes the placement plate 4. The plurality of battery cells 10 are placed on the placement plate 4, and the battery cell supports 2 disposed between the battery cells 10 are fixed to the placement plate 4. The battery module according to the present disclosure does not have to include the placement plate, and the battery cell supports do not have to be fixed to the placement plate. However, the configuration in which the battery cell supports 2 are fixed to the placement plate as in the battery module illustrated in FIGS. 1(a) and 1(b) allows for effective fixation of the battery cells, preventing damage to the battery cells more effectively.

Furthermore, the plurality of battery cells 10 are placed on the placement plate 4 with the vibration insulator 5 therebetween. The battery module according to the present disclosure does not have to include the vibration insulator, and the battery cells do not have to be placed on the placement plate with the vibration insulator therebetween. However, the configuration in which the battery cells 10 are placed on the placement plate A with the vibration insulator 5 therebetween as in the battery module illustrated in FIGS. 1(a) and 1(b) allows for effective reduction of shaking (vibration) of the battery cells 10.

Figure 2:
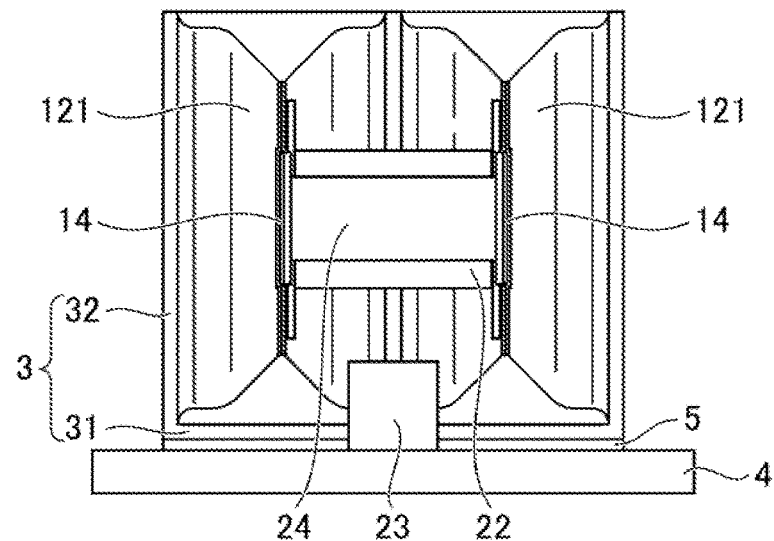
FIG. 2 is an enlarged front view of a dotted portion of the battery module illustrated in FIG. 1A.

FIG. 2 is an enlarged front view of a dotted portion of the battery module 1 illustrated in FIG. 1A. As illustrated in FIGS. 1(a), 1(b), and 2, the battery cell supports 2 in the battery module 1 according to the present embodiment each include current collector tab support portions 22 and bus bar. current-carrying portions 24.

Each of the current collector tab support portions 22 supports current collector tabs 13, current collector tab leads 14, or both on surfaces thereof via exterior casings 12. The battery cell supports in the battery module according to the present disclosure do not have to include the current collector tab support portions, and the current collector tab support portions do not have to support the current collector tabs or the current collector tab leads on the surfaces thereof via the exterior casings. However, the configuration in which the current collector tab support portions 22 support the current collector tabs 13, the current collector tab leads 14, or both on the surfaces thereof as in the battery module 1 illustrated in FIGS. 1(a) and 1(b) helps prevent damage to the battery cells 10 more effectively. In a case where the battery cell supports 2 are formed from a high thermal conductive material such as a metal, in particular, the current collector tab support portions 22 supporting the current collector tabs 13, the current collector tab leads 14, or both on the surfaces thereof allow for, through the resulting contact therebetween, effective dissipation of heat generated from the battery cells 10.

In a case where the current collector tab support portions 22 of the battery cell supports 2 are formed from a high electroconductive material such as a metal, for example, direct contact between the current collector tab support portions 22 and the current collector tab leads 14 exposed outside the exterior casings 12 can cause leakage of electricity. It is therefore preferable that the current collector tab support portions 22 support the current collector tabs 13, the current collector tab leads 14, or both via the exterior casings 12.

The bus bar current-carrying portions 24 are in direct contact with the current collector tab leads 14 and support the current collector tab leads 14 on surfaces thereof. In the configuration of the present embodiment, the plurality of battery cells 10 are connected in parallel through each bus bar current-carrying portion 24 connecting positive electrodes or negative electrodes of adjacent battery cells together. The battery cell supports in the battery module according to the present disclosure do not have to include the bus bar current-carrying portions, and the bus bar current-carrying portions do not have to be in direct contact with the current collector tab leads to support the current collector tab leads on the surfaces thereof. However, the configuration in which the bus bar current-carrying portions are in direct contact with the current collector tab leads and support the current collector tab leads on the surfaces thereof as in the battery module illustrated in FIGS. 1(a) and 1(b) helps prevent damage to the battery cells more effectively and allows the bus bar current-carrying portions 24 to collect therethrough electricity generated from the plurality of battery cells 10 connected in parallel.

As described above, the battery module according to the present embodiment is capable of effectively preventing damage to the battery cells. It is therefore particularly beneficial to apply the battery module according to the present embodiment to transportation (for example, cars) that needs to operate under vibrating conditions, although applications thereof are not particularly limited.

The following subsequently describes components of the battery module according to the present embodiment.

[Battery Cells]

Figure 3:
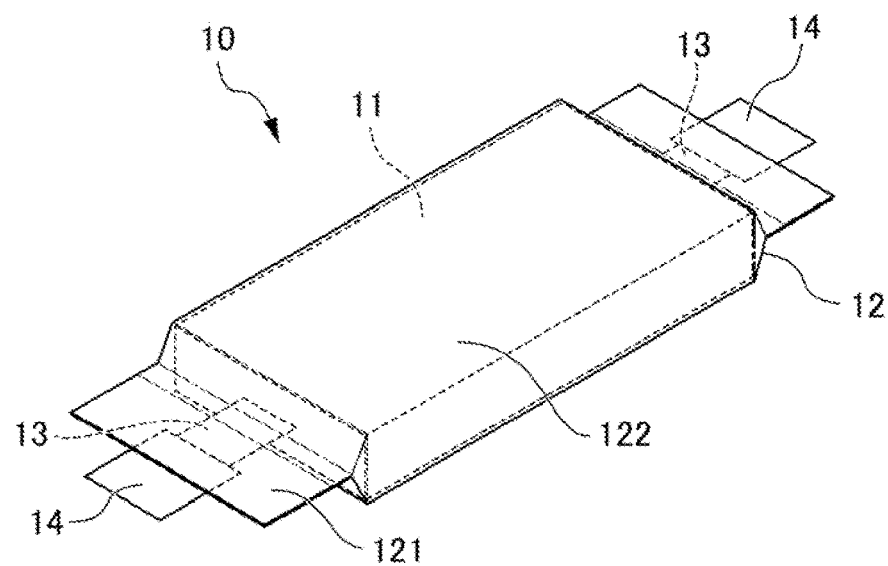
FIG. 3 is a perspective view of battery cells included in the battery module according to the embodiment.

Each of the battery cells 10 includes a battery 11 and the exterior casing 12 accommodating the battery 11 as illustrated in FIG. 3. The battery cell 10 also includes the current collector tabs 13 connected to the battery 11 and the current collector tab leads 14 connected to the respective current collector tabs 13. At least a portion of each current collector tab lead 14 is exposed outside the exterior casing 12. Since at least a portion of each current collector tab lead 14 is exposed outside the exterior casing 12, it is possible to extract electricity through the exposed portions.

The battery 11 may be a liquid-based battery containing an organic electrolytic solution as an electrolyte, a battery containing a gel electrolyte, or a solid-state battery containing a non-flammable solid electrolyte as an electrolyte instead of an organic electrolytic solution serving as an electrolyte.

The following separately describes a solid-state battery containing a solid electrolyte and batteries other than the solid-state battery such as a battery containing an organic electrolytic solution as an electrolyte.

(Solid-State Battery)

A solid-state battery contains a solid electrolyte, and includes a positive electrode, a negative electrode, and a solid electrolyte layer located between the positive electrode and the negative electrode. Current collector tabs are respectively connected to the positive electrode and the negative electrode.

The positive electrode includes a positive electrode current collector and a positive electrode layer formed on a surface of the positive electrode current collector. The negative electrode includes a negative electrode current collector and a negative electrode layer formed on a surface of the negative electrode current collector. The current collector tabs are respectively connected to the positive electrode and the negative electrode, and extend from end surfaces of the battery. No particular limitations are placed on the material usable for the current collector tabs, and the same materials as those of current collector tabs that are used for conventional solid-state batteries may be used.

The positive electrode includes a positive electrode current collector and a positive electrode layer formed on a surface of the positive electrode current collector.

No particular limitations are placed on the positive electrode current collector as long as the positive electrode current collector has a function of collecting current from the positive electrode layer. Examples of materials thereof include aluminum, aluminum alloys, stainless steel, nickel, iron, and titanium, among which aluminum, aluminum alloys, and stainless steel are preferable. Examples of shapes of the positive electrode current collector include a foil shape, a plate shape, a mesh shape, and a foam shape, among which a foil shape is preferable.

The positive electrode layer contains at least a positive electrode active material. A material appropriately selected from known materials capable of releasing and storing ions (for example, lithium ions) may be used as the positive electrode active material. Specific examples of positive electrode active materials include lithium cobalt oxide (LiCoO$_2$), lithium nickel oxide (LiNiO$_2$), LiNi$_p$Mn$_q$Co$_x$O$_2$ (p+q+r=1), LiNi$_p$Al$_q$Co$_r$O$_2$ (p+q+r=1), lithium manganese oxide (LiMn$_2$O$_4$), Li—Mn spinels represented by Li$_1$+xMn$_2$-x-yMyO$_4$ (x+y=2, M=at least one selected from Al, Mg, Co, Fe, Ni, and Zn) in which a portion of Mn is substituted with a different element, and lithium metal phosphates (LiMPO$_4$, M=at least one selected from Fe, Mn, Co, and Ni).

The negative electrode includes a negative electrode current collector and a negative electrode layer formed on a surface of the negative electrode current collector.

No particular limitations are placed on the negative electrode current collector as long as the negative electrode current collector has a function of collecting current from the negative electrode layer. Examples of materials of the negative electrode current collector include nickel, copper, and stainless steel. Examples of shapes of the negative electrode current collector include a foil shape, a plate shape, a mesh shape, and a foam shape, among which a foil shape is preferable.

The negative electrode layer contains at least a negative electrode active material. No particular limitations are placed or, the negative electrode active material as long as the negative electrode active material is capable of releasing and storing ions (for example, lithium ions). Examples thereof include: lithium transition metal oxides such as lithium titanium oxide (Li$_4$Ti$_5$O$_{12}$); transition metal oxides such as TiO$_2$, Nb$_2$O$_3$, and WO$_3$; metal sulfides; metal nitrides; carbon materials such as graphite, soft carbon, and hard carbon; metallic lithium; metallic indium; and lithium alloys. The negative electrode active material may be in powder form or thin film form.

The solid electrolyte layer is disposed between the positive electrode and the negative electrode, and contains at least a solid electrolyte material. The solid electrolyte layer enables ion conduction (for example, lithium ion conduction) between the positive electrode active material and the negative electrode active material through the solid electrolyte material contained therein.

No particular limitations are placed on the solid electrolyte material other than being an ion-conducting material (for example, a lithium ion-conducting material), and examples thereof include sulfide solid electrolyte materials, oxide solid electrolyte materials, nitride solid electrolyte materials, and halide solid electrolyte materials. In particular, sulfide solid electrolyte materials are preferable. This is because sulfide solid electrolyte materials have higher ion conductivity than oxide solid electrolyte materials.

(Batteries Other Than Solid-State Battery)

The battery 11 is not limited to a solid-state battery containing a solid electrolyte such as described above and may be a liquid-based battery containing an electrolytic solution as an electrolyte or a battery containing a gel electrolyte.

A liquid-based battery includes, for example, an electrolytic solution and a battery stack in which at least a positive electrode, a separator, and a negative electrode are stacked in the stated order. The electrolytic solution is, for example, contained within an exterior casing. The liquid-based battery containing an electrolytic solution as an electrolyte can have a smaller electrode-electrolyte interface resistance than a solid-state battery containing a solid electrolyte. Furthermore, the liquid-based battery can be produced at a low cost because a mass production technique thereof has been already established.

Examples of electrolytic solutions usable in the liquid-based battery include a solution of a supporting salt such as LiPF$_6$, LiBF$_4$, or LiClO$_4$ in a solvent such as ethylene carbonate, propylene carbonate, dimethyl carbonate, or diethyl carbonate.

In the case of a gel electrolyte-containing battery, an electrolyte obtained by gelling a combination of an electrolytic solution with a polymer such as poly(vinylidene fluoride-co-hexafluoropropylene; (PVDF-HFP), polyacrylonitrile, polyacrylic acid, or polymethylmethacrylate is preferably used.

As for the positive electrode and the negative electrode, aside from the electrolyte, electrodes similar to those described for the solid-state battery are usable.

[Exterior Casing]

The exterior casing 12 accommodates the battery 11. Hermetically enclosing the battery 11 in the exterior casing 12 precludes the atmosphere from entering the battery 11.

The exterior casing 12 may be a stack of two film sheets having the battery therebetween and hermetically sealed at four joint portions obtained by joining the film sheets opposed to each other at four sides of the stack. However, the exterior casing 12 of the present embodiment is preferably one film sheet that is folded at an end surface of the battery, which has a rectangular shape in plan view, so as to enclose the battery, and that has an exterior casing main portion 122 and exterior casing joint portions 121 obtained by joining ends of the film sheet with the current collector tabs 13 and the current collector tab leads 14 therebetween. This configuration allows the battery cell to have fewer exterior casing joint portions, which are joined portions of the film sheet, reducing formation of dead space and effectively improving the volumetric energy density of the battery module.

The current collector tabs 13 and the current collector tab leads 14 may be in a configuration in which the current collector tabs are connected to the same end surface of the battery or a configuration (for example, FIG. 3) in which the current collector tabs are respectively connected to two end surfaces of the battery.

At least a portion of an end of each current collector tab lead 14 that is located farther from the end surface to which the corresponding current collector tab 13 is connected is exposed outside the exterior casing 12. Electricity can be extracted through the exposed portions of the current collector tab leads 14.

The exterior casing 12 may have further exterior casing joint portions, which are joined ends of the film sheet, at end surfaces other than the end surfaces to which the current collector tabs are connected. However, the exterior casing 12 preferably has no exterior casing joint portions at any other end surfaces than the end surfaces to which the current collector tabs are connected (for example, FIGS. 1(a) and 1(b) of the present application). Providing the fewest possible exterior casing joint portions, which are joined portions of the film sheet, at the end surfaces of the battery helps improve the volumetric energy density of the battery module more effectively.

Examples of exterior casings each formed by folding one film sheet include exterior casings disclosed in WO2019/188825 (for example, exterior casings illustrated in FIGS. 1 to 10 of WO2019/188825).

No particular limitations are placed on film that forms the exterior casing 12 other than being film capable of forming the exterior casing 12 for accommodating the battery 11. Preferably, the film that forms the exterior casing 12 is capable of imparting hermetic properties to the exterior casing 12.

Preferably, the film that forms the exterior casing 12 includes, for example, a barrier layer being a thin Inorganic film such as aluminum foil, a thin inorganic oxide film such as of silicon oxide or aluminum oxide, or the like. By including the barrier layer, the film can impart hermetic properties to the exterior casing 12.

As described later, the exterior casing may have extending portions extending in the stacking direction of the battery module; and the extending portions may fix the plurality battery cells. In this manner, the exterior casing fixes the plurality of battery cells by way of the extending portions extending, thereby enabling more effective prevention of damage to the battery cells. The fixation film wound in the stacking direction may not necessarily be provided, helping reduce the manufacturing process and improve the productivity.

Preferably, the film that forms the exterior casing 12 also includes a seal layer made of a flexible resin such as a polyethylene resin. Opposed portions of the seal layer included in the film can be joined together through welding. This eliminates a step of applying an adhesive. The film that forms the exterior casing 12 does not have to include the seal layer. The exterior casing can be alternatively formed by joining portions of the film together with an adhesive.

The film that forms the exterior casing 12 may be, for example, a laminate of a base layer, the above-described barrier layer, and the above-described seal layer. The base layer is formed from polyethylene terephthalate, polyethylene naphthalate, nylon, polypropylene, or the like. These layers may be laminated using a known adhesive or may be laminated by a laminating method such as extrusion coating.

The film that forms the exterior casing 12 preferably has a thickness of at least 50 μm and more preferably at least 100 μm, depending on the material of the film. The film that forms the exterior casing 12 preferably has a thickness of no greater than 700 μm and more preferably no greater than 200 μm.

The film sheet that forms the exterior casing 12 may be single-layer or multi-layer. The film sheet according to the present disclosure has a flat polygonal shape (rectangular shape) or a cylindrical shape.

[Battery Cell Support]

The battery cell supports 2 are disposed between the battery cells 10. The battery cell supports 2 disposed between the battery cells 10 allow for effective prevention of damage to the battery cells.

Figure 4A:
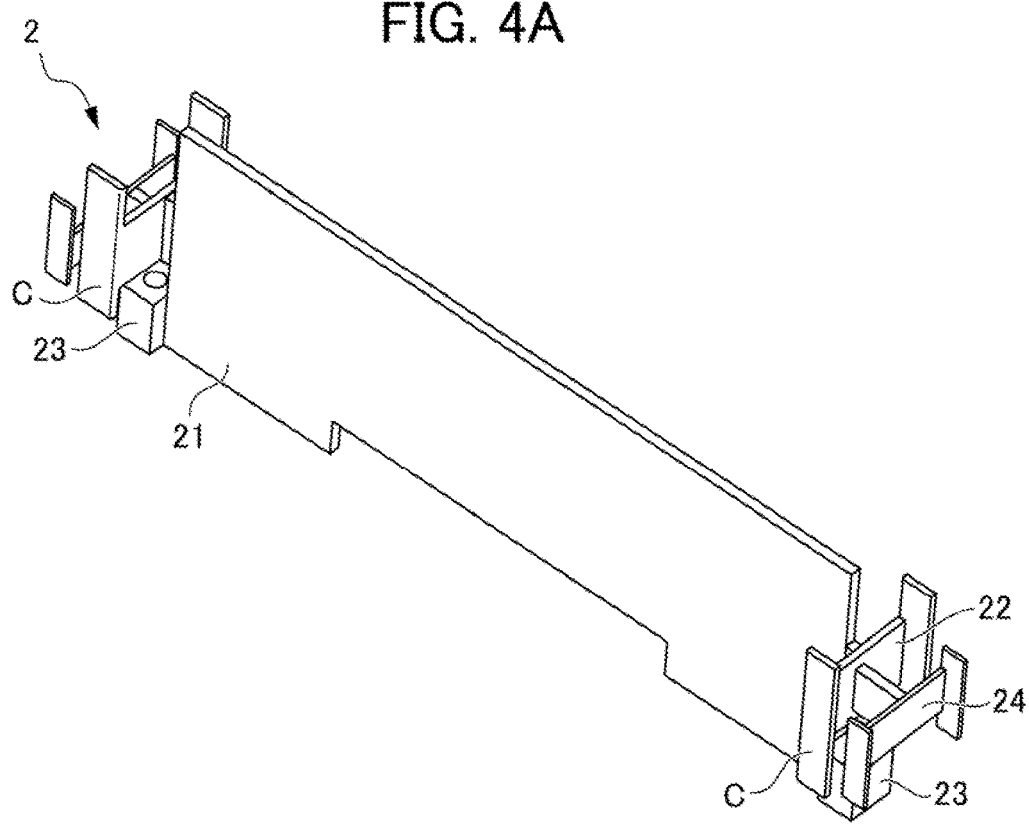
FIG. 4A is a perspective view of a battery cell support included in the battery module according to the embodiment.

As illustrated in FIG. 4A, each of the battery cell supports 2 includes a main body portion 21, the current collector tab support portions 22, placement plate fixation portions 23, the bus bar current-carrying portions 24, and a heat dissipation portion 25.

The main body portion 21 is a portion of the battery cell support that supports adjacent battery cells 10 while in contact mainly with the exterior casings 12 of the battery cells 10. The main body portion 21 directly supports the battery cells 10 on surfaces thereof. This allows for effective prevention of damage to the battery cells.

The main body portion 21 has, for example, a plate shape as illustrated in FIG. 4A. No particular limitations are placed on the thickness of the main body portion 21. For example, the main body portion 21 preferably has a thickness of at least 0.1 mm and no greater than 20 mm, and more preferably at least 0.2 mm and no greater than 10 mm. The thickness of the main body portion 21 being at least 0.1 mm helps prevent damage to the battery cells more effectively. The thickness of the main body portion 21 being no greater than 20 mm helps reduce formation of dead space and effectively improve the volumetric energy density of the battery module.

In a case where each battery cell support is formed from a high thermal conductive material such as a metal, the thickness of the main body portion 21 being at least 0.1 mm helps dissipate heat generated from the battery cells more effectively.

The current collector tab support portions 22 support the current collector tabs 13, the current collector tab leads 14, or both via the exterior casings 12. As illustrated in FIG. 4A, the current collector tab support portions 22 contact the exterior casings 12 (exterior casing joint portions 121) of the battery cells over a predetermined area. The battery cell supports in the battery module according to the present disclosure do not have to include the current collector tab support portions. However, the configuration in which the current collector tab support portions 22 support the current collector tabs 13, the current collector tab leads 14, or both helps prevent damage to the battery cells more effectively. In a case where the current collector tab support portions 22 are formed from a high thermal conductive material such as a metal, furthermore, the current collector tab support portions 22 supporting (contacting) the current collector tabs 13 allow for effective dissipation of heat generated from the battery cells.

It is to be noted that the current collector tab support portions 22 support the current collector, tabs 13, the current collector tab leads 14, or both via the exterior casings 12, and do not come in direct contact with the current collector tabs 13 or the current collector tab leads 14. The current collector tab support portions 22 are separated from the bus bar current-carrying portions 24 that are in direct contact with the current collector tab leads 14 for the purpose of extracting electricity.

A contact area C over which the current collector tab support portions 22 contact the current collector tabs 13 via the exterior casings 12 is not particularly limited, and is preferably at least 0.1 cm$^2$ and no greater than 100 cm$^2$, more preferably at least 0.5 cm$^2$ and no greater than 50 cm$^2$. The contact area C being at least 0.1 cm$^2$ helps prevent damage to the battery cells more effectively. In a case where the battery cell supports are formed from a high thermal conductive material such as a metal, the contact area C being at least 0.5 cm$^2$ helps dissipate heat generated from the battery cells more effectively. The upper limit of the contact area C of the current collector tab support portions 22 contacting the battery cells is not particularly limited. However, in terms of reducing formation of dead space and reducing contact with the current collector tabs in a case where the battery cell supports are formed from a high electroconductive material such as a metal, the upper limit of the contact area C is preferably 100 cm$^2$.

The placement plate fixation portions 23 are located at opposite ends of a lower portion of each battery cell support 2 and fix the battery cell support 2 to the placement plate 4. The battery cell supports in the battery module according to the present disclosure do not have to include the placement plate fixation portions. However, the configuration in which the battery cell supports are fixed to the placement plate allows for effective fixation of the battery cells, preventing damage to the battery cells more effectively.

In the embodiment of FIG. 4A, the placement plate fixation portions 23 are located at opposite ends of a lower portion of each battery cell support 2; however, for example, the placement plate fixation portions 23 may be a locking portion as described later, or may include a locking portion together with the placement plate fixation portions located at opposite ends of a lower portion of each battery cell support 2. Further, a through hole may be formed for inserting shaft components such as bolts, screws and pins; and the battery cell support may be fixed to the placement plate by way of the shaft components.

Furthermore, in a case where the battery cell supports are formed from a high thermal conductive material such as a metal, the contact area between the placement plate 4 and the battery cell supports 2 that is increased as a result of the battery cell supports 2 including the placement plate fixation portions 23 allows for effective dissipation of heat generated from the battery cells.

The bus bar current-carrying portions 24 are in direct contact with the current collector tab leads 14 and extract electricity generated from the battery cells. The battery cell supports in the battery module according to the present disclosure do not have to include the bus bar current-carrying portions 24. However, the configuration in which the bus bar current-carrying portions are in direct contact with the current collector tab leads and support the current collector tab leads on the surfaces thereof helps prevent damage to the battery cells more effectively and allows the bus bar current-carrying portions 24 to collect therethrough electricity generated from the plurality of battery cells. In order to extract electricity generated from the battery cells, the bus bar current-carrying portions 24 are preferably formed from a high electroconductive material such as a metal. In a case where the portions of each battery cell support 2 other than the bus bar current-carrying portions 24 are formed from a high electroconductive material such as a metal, the bus bar current-carrying portions 24 are connected to other portions of the battery cell support 2 via an insulating material, so that electricity generated from the battery cells 10 can be extracted.

The material of the battery cell supports preferably has a thermal conductivity of at least 5 W/(m·K), more preferably at least 20 W/(m·K), and still more preferably at least 50 W/(m·K). This helps dissipate heat generated from the battery cells more effectively.

Preferably, the entirety of each battery cell support is formed from the same material, because this helps dissipate heat generated from the battery cells more effectively. However, the main body portion 21, the current collector tab support portions 22, the placement plate fixation portions 23, the bus bar current-carrying portions 24, and the heat dissipation portion 25, for example, may be formed from different materials.

Figure 4B:
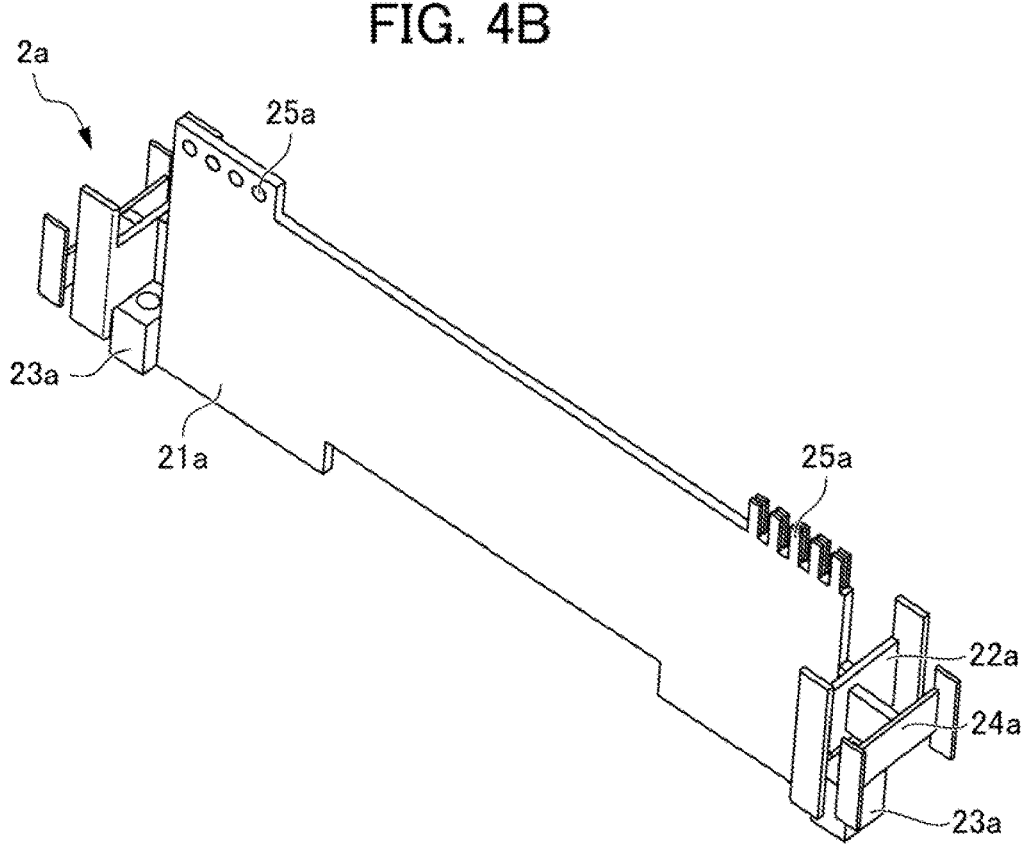
FIG. 4B is a perspective view of a battery cell support included in the battery module according to the embodiment.

FIG. 4B illustrates another preferable battery cell support 2a. The battery cell support 2a illustrated in FIG. 4B further includes a heat dissipation portion 25a. The heat dissipation portion 25a is formed in an end (for example, an upper end as illustrated in FIG. 4B) of the battery cell support, and has a comb shape, a sawtooth shape, or a shape including through holes. This increases the surface area of the battery cell support and allows for effective dissipation of heat generated from the battery cells, which is particularly true for the case where the battery cell support is formed from a high thermal conductive material such as a metal.

The material of the battery cell support 2a is not particularly limited and may be a low thermal conductive material such as a resin. However, a high thermal conductive material such as a metal is preferable. The use of a high thermal conductive material allows for effective prevention of damage to the battery cells 10 and effective dissipation of heat generated from the battery cells 10.

[Fixation Film]

The fixation film allows for fixation of the plurality of battery cells 10, preventing damage to the battery cells more effectively. Examples of fixation film include adhesive tape made from known paper, cloth, film (cellophane, oriented polypropylene (OPP), acetate, polyimide, polyvinyl chloride (PVC), etc.), or metal foil.

When the fixation film is provided, the battery cell support preferably prevents the fixation film from interfering with the battery cell support in the height direction. Specifically, the fixation film preferably has a low-height portion having a height equal to or lower than the battery cell; and the fixation film preferably overlaps with the low-height portion of the battery cell support. This can prevent the fixation film from interfering with the battery cell support, thereby enabling effective fixation of the plurality of battery cells.

[Cooling Plate]

The cooling plate 3 dissipates heat generated from the battery cells 10 by being in contact with the battery cells 10. The cooling plate 3 includes, for example, the battery cell placement portions 31 that receive the placement surfaces of the battery cells 10, and the battery cell interposition portions 32 that extend upward from the battery cell placement portions 31 and that are interposed between the battery cells 10. The material of the cooling plate 3 is not particularly limited and is preferably a high thermal conductive material such as a metal. The use of a high thermal conductive material allows for effective prevention of damage to the battery cells 10 and effective dissipation of heat generated from the battery cells 10. The cooling plate 3 may be fixed to the placement plate. This reduces vibration in the stacking direction and allows for effective prevention of damage to the battery cells 10.

The material of the cooling plate 3 preferably has a thermal conductivity of at least 5 W/(m·K), more preferably at least 20 W/(m·K), and still more preferably at least 50 W/(m·K). This helps dissipate heat generated from the battery cells more effectively.

[Placement Plate]

The plurality of battery cells are placed on the placement plate 4. The material of the placement plate 4 is not particularly limited and is preferably a high thermal conductive material such as a metal. The use of a high thermal conductive material allows for effective prevention of damage to the battery cells 10 and effective dissipation of heat generated from the battery cells 10.

The material of the placement plate 4 preferably has a thermal conductivity of at least 5 W/(m·K), more preferably at least 20 W/(m·K), and still more preferably at least 50 W/(m·K). This helps dissipate heat generated from the battery cells 10 more effectively,

[Vibration Insulator]

The plurality of battery cells 10 are placed on the placement plate 4 with the vibration insulator 5 therebetween. The use of the vibration insulator 5 effectively reduces vibration of the battery cells 10 placed on the placement plate 4. The vibration insulator 5 can be formed from a known material such as urethane rubber or silicone rubber.

<Battery Module According to Another Embodiment>

Figure 5A:
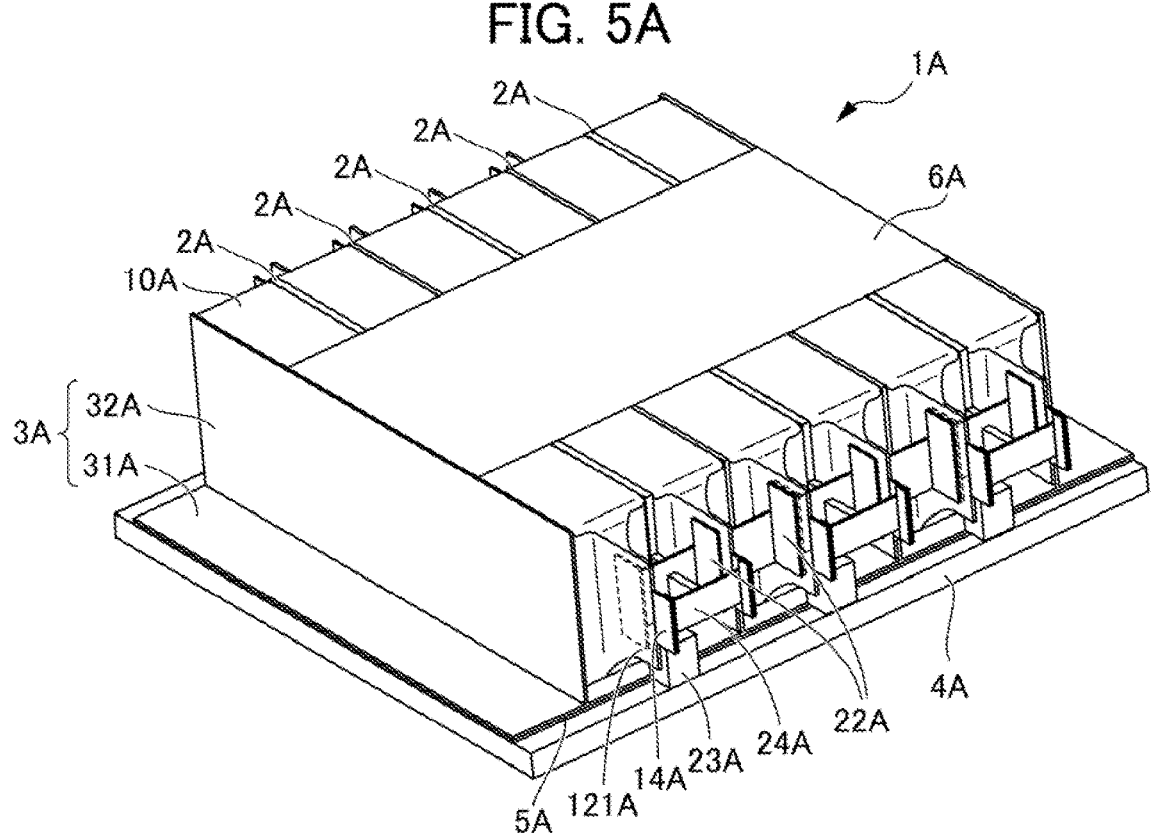
FIG. 5A is a perspective view of a battery module according to another embodiment.
Figure 5B:
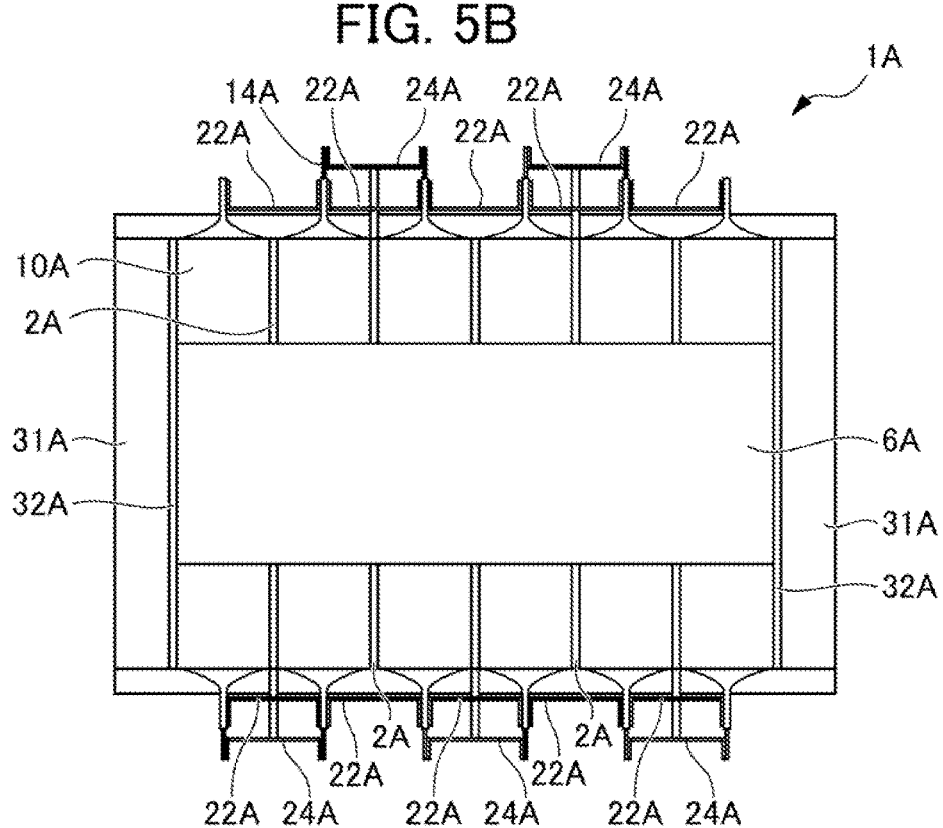
FIG. 5B is a plan view of the battery module according to the other embodiment.

FIGS. 5(a) and 5(b) are a perspective view and a plan view, respectively, illustrating a battery module 1A according to another embodiment. It is to be noted that description of features in common with the embodiment described above are omitted. This embodiment has a configuration in which a plurality of battery cells 10A are connected in series through bus bar current-carrying portions 24A each connecting a positive electrode of a battery cell and a negative electrode of an adjacent battery cell. Through the configuration in which the plurality of battery cells 10A are connected in series, it is possible to extract electricity.

As described above, the battery cells may be connected in parallel or in series depending on properties desired for the battery module. It is to be noted that a configuration including battery cells connected in series and battery cells connected in parallel may be employed to control the output voltage and the battery capacity as desired for the battery module.

Figure 6B:
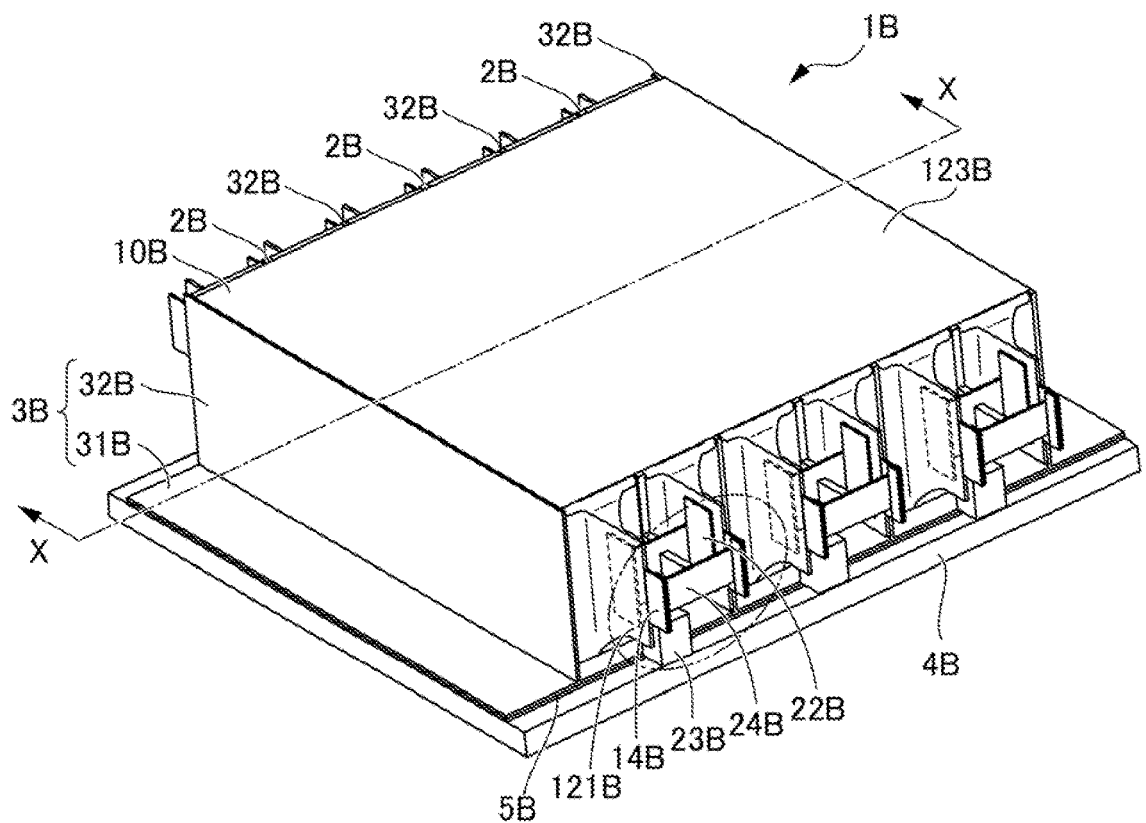
FIG. 6B is a perspective view of a battery module according to another embodiment.
Figure 6C:
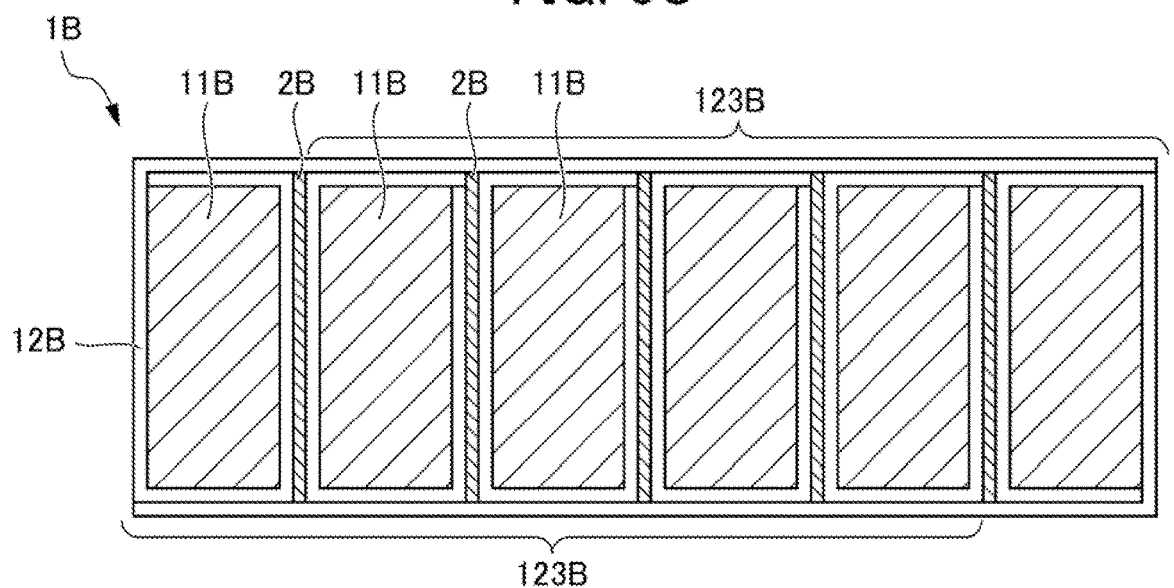
FIG. 6C is a cross-sectional view of the battery module along the X-X line illustrated in FIG. 6B.

FIGS. 6A to 6C show a perspective view of a battery cell 10B according to another embodiment (FIG. 6A), a perspective view of a battery module 1B (FIG. 6B), and a cross-sectional view along the X-X line illustrated in FIG. 6B; (FIG. 6C), respectively. It is to be noted that description of features in common with the embodiment described above are omitted. As illustrated in FIG. 6A, this embodiment is characterized in that an exterior casing of a single battery cell 10B has extending portions 123B extending. The extending portions 123B have a function to fix the plurality of battery cells 10B by extending in the stacking direction of the battery module. More specifically, in the battery module 1B according to the present embodiment, the exterior casing 12B prevents air from entering the battery 11B and also serves as a fixation film for fixing the plurality of battery cells 10B. Therefore, the battery module 1B according to the present embodiment may not include the fixation film wound in the stacking directions described above.

In this manner, the exterior casing fixes the plurality of battery cells by way of the extending portions extending, thereby enabling more effective prevention of damage to the battery cells. The fixation film wound in the stacking direction may not necessarily be provided, helping reduce the manufacturing process and improve the productivity.

FIGS. 6B and 6C show a perspective view (FIG. 6B) and a cross-sectional view (FIG. 6C) of a battery module 1B including the battery cell 10B, respectively. In this embodiment, the extending portions 123B of the two battery cells 10B disposed at both ends of the battery module 1B are configured to extend in the stacking direction of the battery module so as to face each other, and the extending portions 123B are joined to the exterior casing of the other battery cells.

As in the battery module 1B, the extending portions 123B of the two battery cells 10B extend to face each other, enabling more robust fixation of the plurality of battery cells 10B.

In this embodiment, the extending portions are configured to be joined to the exterior casing of the other battery cells; however, the exterior casing and the extending portions may not necessarily be joined, as long as a plurality of battery cells can be fixed. Further, for example, the plurality of battery cells may be fixed by winding the extending portions in the stacking direction.

In this embodiment as well, the battery cell support 2B preferably has a low-height portion having a height equal to or lower than the battery cell 10B in the height direction; and the extending portions 123B for fixing the battery cell 10B preferably overlap with the low-height portion of the battery cell support 2B in the height direction. This can prevent the extending portions 123B from interfering with the battery cell support 2B, enabling effective fixation of the plurality of battery cells 10B.

Figure 7A:
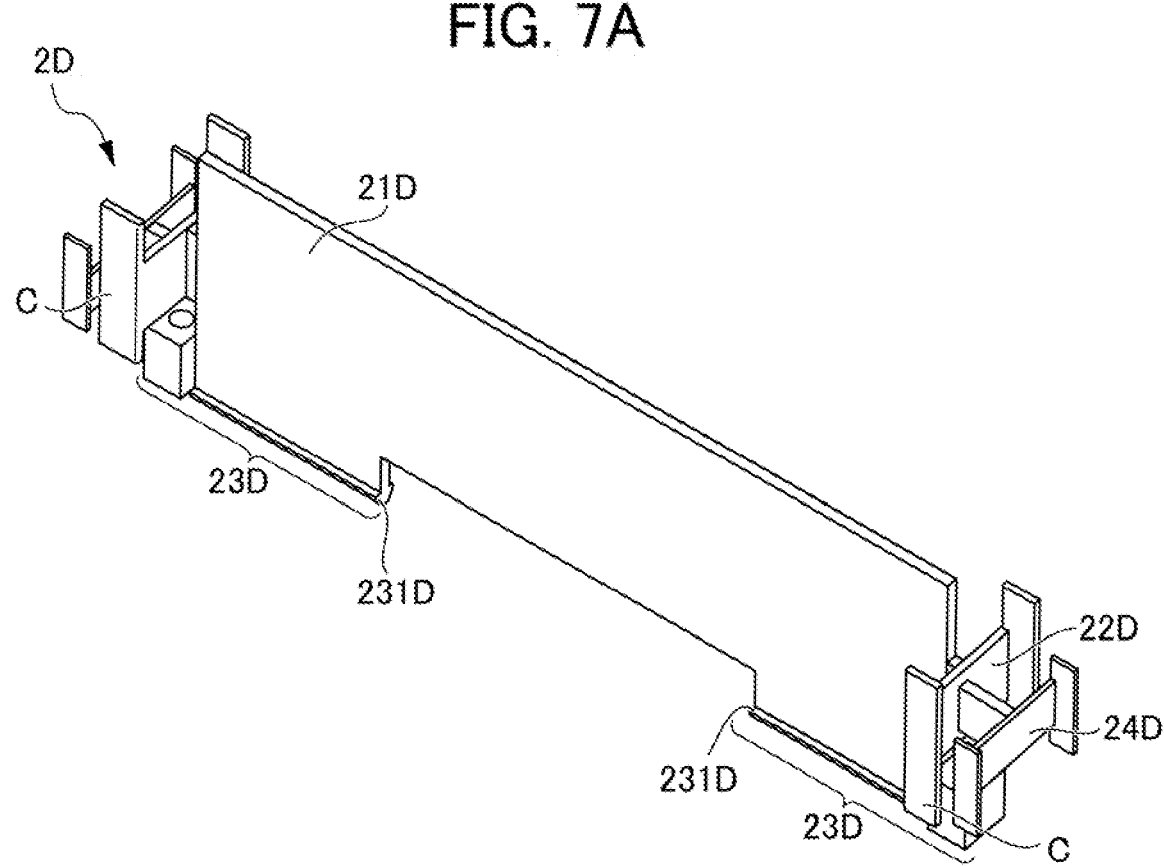
FIG. 7A is a perspective view of a battery cell support according to another embodiment.

FIG. 7A shows a perspective view of a battery cell support 2D provided to a battery module 1D according to another embodiment. It is to be noted that description of features in common with the embodiment described above are omitted. In this embodiment, the battery cell support 2D has locking portion 231D as placement plate fixation portions 23D. The locking portion may have a shape capable of locking as disposed between the interposition portions; and examples of the locking portion may Include a locking portion having a convex shape protruding in the thickness direction as illustrated in FIG. 7A, or a locking portion having a convex shape protruding in the width direction.

Figure 7B:
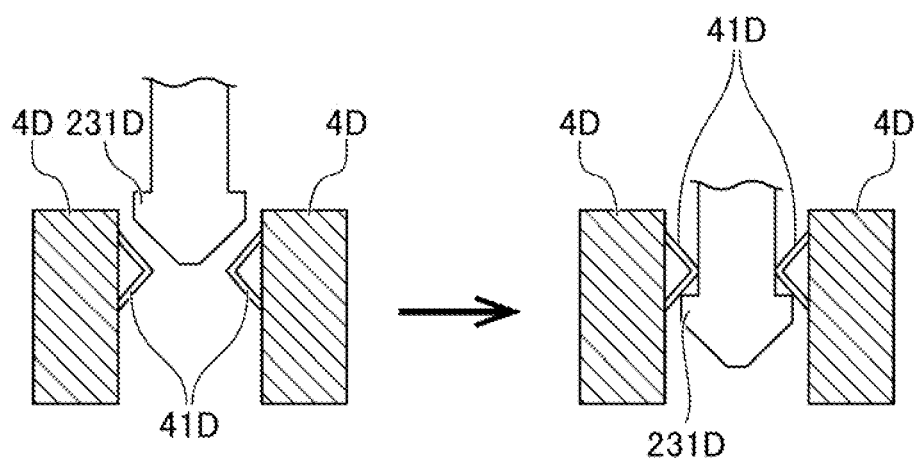
FIG. 7B is a diagram schematically showing an aspect in which the placement plate fixation portions are inserted and disposed between the elastic interposition portions.

In this embodiment, the placement plate includes interposition portions 41D. As illustrated in FIG. 7B, the locking portion 231D is inserted between the interposition portions 41D of the placement plate 4D, and the locking portion 231D is disposed and locked between the interposition portions 41D. This fixes the battery cell support 2D to the placement plate 4D.

In this manner, the battery cell support 2D is fixed to the placement plate 4D, thereby enabling more effective prevention of damage to the battery cells. The interposition portions 41D are provided in this manner, whereby the battery cell support can be easily positioned, and the assembly (productivity) can be improved as well.

The interposition portions are not particularly limited as long as being capable of interposing the locking portion 231D of the battery cell support 2, and are preferably elastic interposition portions composed of an elastic body. This enables an extremely simple structure to lock the locking portion 231D. The elastic interposition portions may be, for example, a spring material, or a leaf spring-like member formed using a resin such as elastomer or a material such as metal.

Figure 8A:
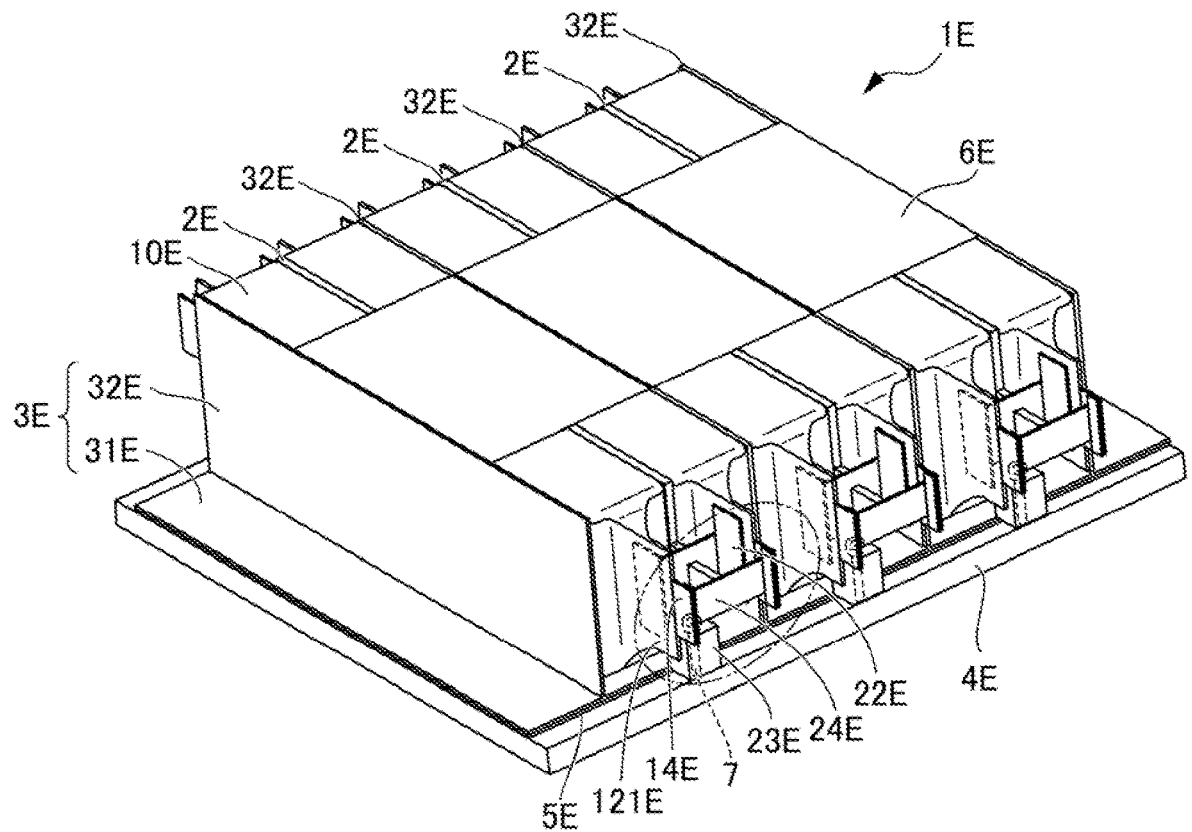
FIG. 8A is a perspective view of a battery module according to another embodiment.
Figure 8B:
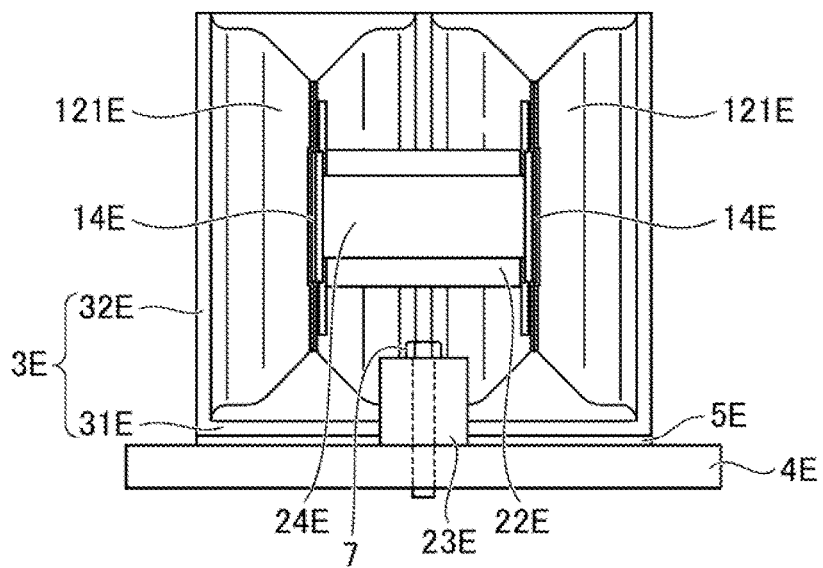
FIG. 8B is an enlarged front view of a dotted portion of the battery module illustrated in FIG. 8A.

FIGS. 8A and 8*b* show a perspective view (FIG. 8A) of a battery module 1E according to another embodiment, and an enlarged front view (FIG. 8B) of a dotted portion of the battery module illustrated in FIG. 8A. It is to be noted that description of features in common with the embodiment described above are omitted. In this embodiment, holes are correspondingly formed in a battery cell support 2E and a placement plate 4E, respectively; and shaft components 7 such as bolts, screws or pins are inserted into the holes, whereby the battery cell support 2E is fixed to the placement plate 4E. The hole may be a through hole or a non-through hole as long as the shaft component can be inserted. In the case of using a bolt as the shaft component 7, a nut or the like may be provided to a lower portion. In this case, the placement plate may be provided with a nut arrangement portion formed as recessing from a lower surface side towards an upper surface side thereof.

In this manner, the battery cell support 2E is fixed to the placement plate 4E, thereby enabling more effective prevention of damage to the battery cells.

As described above, when the battery module includes the extending portions fixing the plurality of battery cells, or the battery module includes the battery module having the battery cell support being fixed to the placement plate, damage to the battery cells can be prevented more effectively. It is therefore particularly beneficial to apply the battery module according to the present embodiment to transportation (for example, cars) that needs to operate under vibrating conditions and will be used as a large-size battery module, although applications thereof are not particularly limited.

The battery module according to the present embodiment is not limited to a battery module having a plurality of solid-state battery cells arranged, and can be used particularly suitably as a battery module arranging a plurality of solid-state battery cells involving a high risk of breakage due to stress.

As described above, the battery module according to the present disclosure includes a plurality of battery cells stacked on one another and is capable of effectively preventing damage to the battery cells despite such a configuration.

EXPLANATION OF REFERENCE NUMERALS 1, 1A, 1B, 1D, 1E: Battery module
10, 10A, 10B, 10E: Battery cell
11, 11B Battery
12: Exterior casing
121, 121A, 121B, 121E: Exterior casing joint portion
122, 122B: Exterior casing main portion
123B: Extending portion
13, 13B: Current collector tab
14, 14A, 14B, 14E: Current collector tab lead
2, 2a, 2A, 2B, 2D, 2E: Battery cell support
21, 21a, 21B, 21D: Main body portion
22, 22a, 22A, 22B, 22D, 22E: Current collector tab support portion
23, 23a, 23B, 23D, 23E: Placement plate fixation portion
231D: Locking portion
24, 24a, 24A, 24B, 24D, 24E: Bus bar current-carrying portion
25a: Heat dissipation portion
3, 3A, 3B, 3E: Cooling plate
31, 31A, 31B, 31E: Battery cell placement portion
32, 32A, 32B, 32E: Battery cell interposition portion
4, 4A, 4B, 4D, 4E: Placement plate
41D: Interposition portion (elastic interposition portion)
5, 5A, 5B, 5E: Vibration insulator
6, 6A, 6E: Fixation film
7: Shaft component

What is claimed is:

1. A battery module comprising:
a plurality of battery cells stacked on one another, the battery cells each including a battery and an exterior casing accommodating the battery; and
the plurality of battery cells being placed on a placement plate, each of the battery cells including a current collector tab connected to the battery and a current collector tab lead connected to the current collector tab, at least a portion of the current collector tab lead being exposed outside the exterior casing,
wherein a battery cell support is disposed between the plurality of battery cells and directly supporting the battery cells on surfaces thereof, the battery cell support being fixed to the placement plate, wherein the battery cell support includes:
a main body portion that supports each of the battery cells on surfaces thereof via the exterior casing,
a current collector tab support that supports the current collector tab and/or the current collector tab lead on surfaces thereof via the exterior casing,
a placement plate fixation portion that is disposed in the lower part of the battery cell support and that fixes the battery cell support to the placement plate,
a bus bar current-carrying portion that is directly in contact with the current collector tab lead to support the current collector tab lead on surfaces thereof,
wherein the battery cell support includes a heat dissipation portion, and
wherein the main body portion and the current collector tab support are connected via a connection portion, and the current collector tab support and the bus bar current-carrying portion are connected via a connection portion.

2. The battery module according to claim 1, further comprising
a fixation film wound around the plurality of battery cells in a stacking direction and fixing the plurality of battery cells.

3. The battery module according to claim 1, wherein
the exterior casing of at least one battery cell of the plurality of the battery cells includes extending portions extending in a stacking direction of the battery module, and
the extending portions fix the plurality of battery cells.

4. The battery module according to claim 3, wherein
the extending portions of two battery cells of the plurality of battery cells extend in the stacking direction of the battery module so as to face each other.

5. The battery module according to claim 1 wherein
the battery cell support includes a low-height portion having a height equal to or lower than the battery cell in a height direction perpendicular to the stacking direction, and
a fixation film or extending portions for fixing the battery cell overlap with the low-height portion of the battery cell support.

6. The battery module according to claim 1, wherein
the battery cell support includes a locking portion,
the placement plate includes interposition portions capable of interposing the locking portion, and
the interposition portions interpose the locking portion, whereby the battery cell support is fixed to the placement plate.

7. The battery module according to claim 6, wherein
the interposition portions of the placement plate are elastic interposition portions.

8. The battery module according to claim 1, wherein
holes are correspondingly formed in the battery cell support and the placement plate, respectively, and
shaft components are inserted into the holes, whereby the battery cell support is fixed to the placement plate.

9. The battery module according to claim 2 wherein
the battery cell support includes a low-height portion having a height equal to or lower than the battery cell in a height direction perpendicular to the stacking direction, and
a fixation film or extending portions for fixing the battery cell overlap with the low-height portion of the battery cell support.

10. The battery module according to claim 6, wherein
holes are correspondingly formed in the battery cell support and the placement plate, respectively, and
shaft components are inserted into the holes, whereby the battery cell support fixed to the placement plate.

11. The battery module according to claim 2, wherein
the battery cell support includes a heat dissipation portion.

12. The battery module according to claim 3 wherein
the battery cell support includes a low-height portion having a height equal to or lower than the battery cell in a height direction perpendicular to the stacking direction, and a fixation film or extending portions for fixing the battery cell overlap with the low-height portion of the battery cell support.

* * * * *